(12) United States Patent
Tarng et al.

(10) Patent No.: US 7,947,763 B2
(45) Date of Patent: May 24, 2011

(54) EXTERIOR DEEP BASE PAINT FORMULATION

(75) Inventors: Ming-Ren Tarng, Irvine, CA (US); Mark Minamyer, Aliso Viego, CA (US); Anh Pham, Irvine, CA (US); Stan Brownell, Rancho Santa Margarita, CA (US); Annie Pham, Anaheim, CA (US); Anil Alexander, Santa Ana, CA (US); Deven Shah, La Palma, CA (US); Kim L. Nguyen, Santa Ana, CA (US); My Linh Pham, Anaheim, CA (US); Sidney Maxey, Mission Viejo, CA (US)

(73) Assignee: Behr Process Corporation, Santa Ana, CA (US)

( * ) Notice: Subject to any disclaimer, the term of this patent is extended or adjusted under 35 U.S.C. 154(b) by 1035 days.

(21) Appl. No.: 11/453,180

(22) Filed: Jun. 13, 2006

(65) Prior Publication Data

US 2007/0221097 A1    Sep. 27, 2007

Related U.S. Application Data

(63) Continuation-in-part of application No. 10/914,439, filed on Aug. 9, 2004.

(51) Int. Cl.
*C08J 3/05* (2006.01)
*C08K 3/22* (2006.01)

(52) U.S. Cl. ......... 523/333; 524/430; 524/432; 524/501

(58) Field of Classification Search .................. 523/333; 524/501, 430, 432
See application file for complete search history.

(56) References Cited

U.S. PATENT DOCUMENTS

| | | | |
|---|---|---|---|
| 4,444,937 A * | 4/1984 | Badertscher | 524/425 |
| 4,771,086 A | 9/1988 | Martin | |
| 4,895,900 A | 1/1990 | Sukejima et al. | |
| 4,927,464 A | 5/1990 | Cowie | |
| 5,115,457 A | 5/1992 | Lewandowski et al. | |
| 5,338,354 A | 8/1994 | Melville et al. | |
| 5,385,960 A | 1/1995 | Emmons et al. | |
| 5,412,019 A | 5/1995 | Roulstone et al. | |
| 5,509,960 A | 4/1996 | Simpson et al. | |
| 5,534,585 A | 7/1996 | Roulstone et al. | |
| 5,643,592 A | 7/1997 | Jacobson et al. | |
| 5,650,002 A * | 7/1997 | Bolt | 106/438 |
| 5,688,853 A | 11/1997 | Salter et al. | |
| 5,770,310 A | 6/1998 | Noguchi et al. | |
| 5,886,069 A | 3/1999 | Bolt | |
| 5,976,237 A | 11/1999 | Halko et al. | |
| 6,005,044 A | 12/1999 | Karl et al. | |
| 6,020,416 A * | 2/2000 | Mazur et al. | 524/501 |
| 6,040,360 A | 3/2000 | Menovcik et al. | |
| 6,040,913 A | 3/2000 | Johnson | |
| 6,080,800 A | 6/2000 | Frey et al. | |
| 6,080,802 A | 6/2000 | Emmons et al. | |
| 6,086,668 A | 7/2000 | Farneth et al. | |
| 6,143,064 A | 11/2000 | Virtanen | |
| 6,200,375 B1 | 3/2001 | Guez et al. | |
| 6,200,674 B1 | 3/2001 | Kumar et al. | |
| 6,218,012 B1 | 4/2001 | Rota et al. | |
| 6,261,691 B1 | 7/2001 | Atarashi et al. | |
| 6,337,362 B1 | 1/2002 | Reynolds et al. | |
| 6,492,435 B1 | 12/2002 | Miyamoto et al. | |
| 6,576,051 B2 | 6/2003 | Bardman et al. | |
| 6,667,360 B1 | 12/2003 | Ng et al. | |
| 6,727,309 B1 | 4/2004 | Paiva et al. | |
| 6,740,312 B2 | 5/2004 | Chopin et al. | |
| 6,743,286 B2 | 6/2004 | Wen et al. | |
| 2002/0028867 A1 | 3/2002 | Cottis | |
| 2002/0112644 A1 | 8/2002 | Nakamura et al. | |
| 2003/0018103 A1 | 1/2003 | Bardman et al. | |
| 2003/0024437 A1 | 2/2003 | Wen et al. | |
| 2003/0089278 A1 | 5/2003 | Bettler et al. | |
| 2003/0144399 A1 | 7/2003 | Matta et al. | |
| 2003/0176550 A1 | 9/2003 | Rediske et al. | |
| 2003/0212187 A1 | 11/2003 | Cottis | |
| 2003/0219391 A1 | 11/2003 | Liew et al. | |
| 2004/0063846 A1 | 4/2004 | Lettmann et al. | |
| 2004/0068035 A1 | 4/2004 | Paiva et al. | |
| 2004/0138389 A1 | 7/2004 | Baumgart et al. | |
| 2004/0202601 A1 | 10/2004 | Wen et al. | |
| 2006/0030656 A1 | 2/2006 | Tarng et al. | |
| 2007/0221097 A1 | 9/2007 | Tarng et al. | |

FOREIGN PATENT DOCUMENTS

| | | |
|---|---|---|
| EP | 0 402 932 A1 | 12/1990 |
| EP | 0 549 145 A1 | 6/1993 |
| EP | 0549145 A1 | 6/1993 |
| EP | 0 615 534 B1 | 9/1994 |
| EP | 0 615 535 B1 | 9/1994 |
| EP | 0 625 541 B1 | 11/1994 |
| EP | 0615534 B1 | 4/1997 |
| EP | 0615535 B1 | 5/1998 |
| EP | 0625541 B1 | 3/1999 |
| EP | 1 070 739 A2 | 1/2001 |
| EP | 1 270 687 A2 | 1/2003 |
| GB | 1 352 618 | 5/1974 |
| GB | 1 532 521 | 11/1978 |

OTHER PUBLICATIONS

Kidd, James, "Don't Skip the Primer," Fine Homebuilding, Feb./Mar. 2004, 5 pages.
Woodard, Jeff, "Primer and Undercoat." PaintPRO, vol. 3, No. 5, Aug. 2001, 6 pages.

* cited by examiner

*Primary Examiner* — Vickey Nerangis
(74) *Attorney, Agent, or Firm* — Rathe Lindenbaum LLP

(57) ABSTRACT

The present invention provides increased stain resistance, tannin blocking, adhesion, and various other properties. A composition in accordance with the principles of the present invention comprises at least three binders, nanoparticle pigment, and pigmentary titanium dioxide. In one embodiment, the present invention relates to a coating on a substrate wherein the coating has three binders, nanoparticle metal oxide pigment, and pigmentary titanium dioxide. Various additives may be included to formulate paint as known in the art.

8 Claims, 7 Drawing Sheets

EXTERIOR DEEP BASE PAINT FORMULATION

RELATED APPLICATIONS

This application is a continuation-in-part of U.S. patent application Ser. No. 10/914,439, hereby incorporated in its entirety.

FIELD OF THE INVENTION

The present invention relates to paints with polymer resin deep base formulation. More particularly, the present invention relates to paints having a nanoparticle based pigment and at least three binders.

BACKGROUND OF THE INVENTION

Traditionally, consumers have had to choose between the superior durability offered by latex paints and the superior hiding properties of oil-based paint. Conventional latex or emulsion paints require an underlying primer coat prior to their application to provide an adequate level of blocking and to prevent bleed-through, such as of tannins. In addition, many conventional latex paints require a primer coat to provide adequate adhesion and durability for specific applications. Often, even when a primer is applied, multiple coats of the prior art paints are required to prevent an alteration of color due to the presence of the primer or bleed through of dyes and pigments from the underlying substrate. In fact, multiple applications of prior art paint will not prevent bleed-through on substrates such as cedar since the dyes and pigments, such as tannins contained in the substrates, are often water soluble and diffuse through each layer of the latex paint.

Paint typically contains four essential ingredients, namely pigment, binder, liquid and additives. Any or all of these ingredients may be a single component or may comprise multiple items. Pigment provides color to paint and also makes paint opaque, and pigment is usually of mineral or organic origin although some pigments are artificially produced. Some pigments possess little or no bulk and must be fixed on a more solid, but at the same time transparent, substance or base. "Prime" pigments provide color and opacity (opaque coverage). The most common prime pigment is titanium dioxide, which is white and is used in latex and oil-based paints.

Traditionally, pigments have also added hiding properties to paint. Specialty or extender pigments may also be used and provide bulk to the paint at a low cost. The extender pigments are often chosen for their impact on properties like scrub resistance, stain resistance and chalk resistance. Alum or clay are frequently used for this purpose. These pigments are added to the paint to provide certain characteristics such as thickness, a certain level of gloss and durability. They are usually naturally occurring products which originally were in the earth and were mined and purified for use in paint. Such pigments as calcium carbonate, talc and clay are, for example, used extensively in paints.

The binder holds the pigment and also adheres it to a surface, and a binder composition may have more than one component. In latex paint, the latex resin is the binder. Most commonly in latex paint, the binder is 100% acrylic, vinyl acrylic (polyvinyl acetate), or styrenated acrylic. The pigment particles are insoluble and merely form a suspension in the binder. The binder "binds" the pigment into a tough, continuous film and as noted above helps the paint adhere to the surface. In addition, it has been found previously that the use of 100% acrylic binder provides for maximum adhesion when wet and also provides for resistance to blistering and peeling, resistance to mildew and dirt, and alkali resistance for paint applied over fresh masonry.

Liquids carry the pigment and binders, and this liquid is the part of the paint or coatings product which evaporates. The role of the liquid is to keep the paint in a fluid form for ease of application. Once applied to the surface it evaporates leaving a uniform film which then dries to form a protective coating. The liquid used is primarily determined by the solubility of the binder. In oil-based and alkyd paints, the liquid is typically an organic solvent, and in latex paints, the liquid is typically water. Traditionally, top quality paints have less liquid and more solids (i.e. pigment & binders) as measured by percent solid.

Additives are ingredients used at low levels to provide key properties, such as but not limited to: mildew resistance, improved flow and leveling, and spatter resistance. Common additives used in conventional paint formulations include rheology modifiers, surfactants, defoamers, coalescents, and biocides. Other numerous additives are well-known in the art and may be utilized as required to formulate a paint having the desired properties.

Various techniques are known in the art for producing paints having various types of sheens, i.e. "shine" or gloss. For example, by incrementally increasing pigment levels and/or by using larger pigment particles, various gloss levels can be achieved including, but not limited to flat, satin, and semi-gloss. Pigment volume concentration (PVC) is often associated with the paint finish, although various finishes may have overlapping ranges of PVC. PVC is the unit volume of pigments as a percentage of the volume of pigments plus the volume of the binder. PVC represents the relationship between durability of the coating and the amount of pigment.

In addition to the sheens, it is well known in the art to formulate paint compositions to allow for the desired pigment which is added for color. For example, where a near white coating is desired a high volume of $TiO_2$ may be used and a small volume of coloring pigment is necessary. In contrast, where a dark color is preferred in the final coating, a large volume of coloring pigment is needed and a corresponding decrease in the amount of $TiO_2$ is necessary.

Thus, there is a need for a high colorant volume paint composition and method of making the same to replace the traditional role of a primer and topcoat system and which is capable of providing a coating having improved properties such as, tannin blocking, hiding power, stain removal, and corrosion resistance.

SUMMARY OF THE INVENTION

The present invention relates generally to a binder composition and a paint system with superior tannin blocking, stain removal, corrosion resistance, adhesion, and various other improved properties. The present invention preferably includes a three binder system with an inorganic nano-particle pigment and with a pigmentary titanium dioxide. In one embodiment, a paint composition in accordance with the principles of the present invention further includes additives for formulating paint. In another embodiment, the present invention relates to a coating on a substrate that provides improved coverage through the use of at least three binders, an inorganic nano-particle pigment and a pigmentary titanium dioxide.

DETAILED DESCRIPTION OF THE PREFERRED EMBODIMENTS

Figure 1:
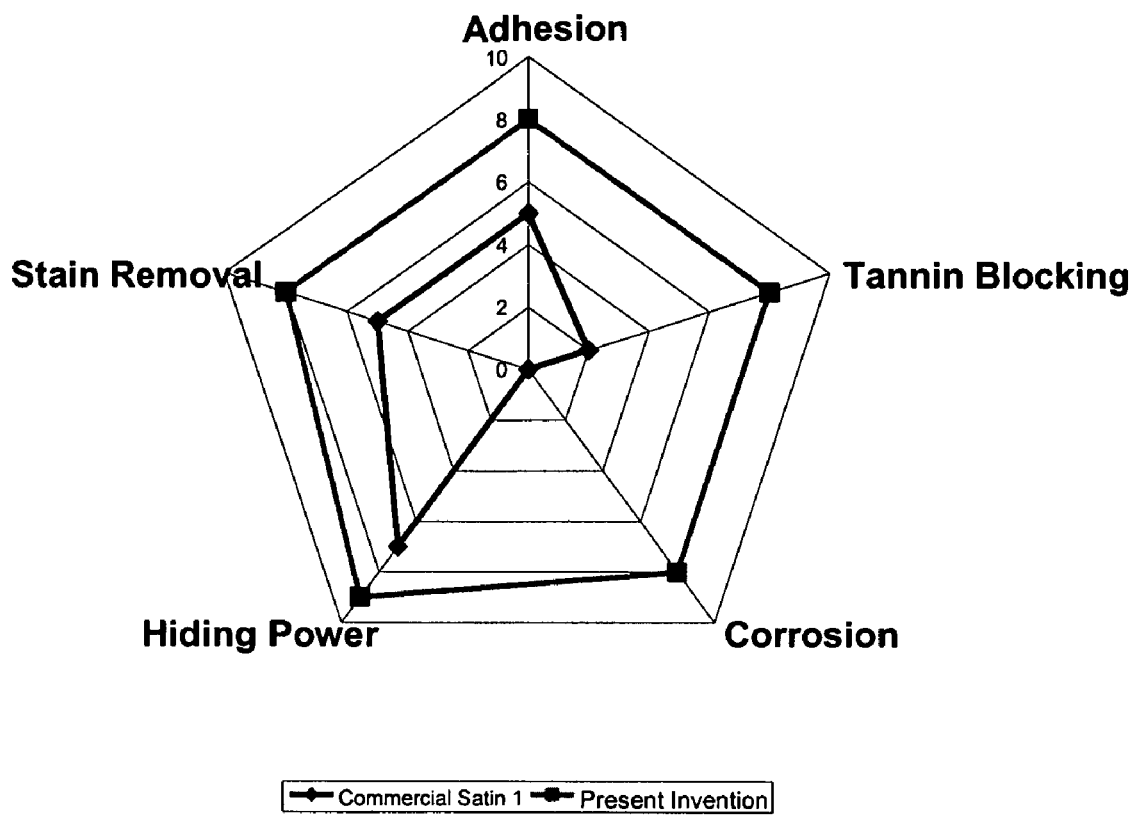
FIG. 1 depicts a multi-axis property graph of the test results of paint of the present invention having a satin sheen and white base, as compared to commercially available exterior satin in a white base.

The present invention is directed in part to a polymer composition within a paint system which replaces the traditional role of a primer and a topcoat with improved properties such as tannin blocking, stain removal, adhesion, and corrosion resistance. In one embodiment, the present invention relates to a composition having a first binder, a second binder, inorganic nanoparticle pigments, and in some cases a third binder. This composition can be used in a conventional paint formulation as known in the art.

Binders for use in the present invention include those prepared by conventionally known methods. Suitable binders include, but are not limited to, 100% acrylic resins and styrenated, acrylic resins as manufactured. Preferably, the first binder is a 100% acrylic resin designed to be used as a primer vehicle, and the second binder is a 100% acrylic resin designed to be used in top coating applications.

Pigments for use in the present invention may comprise any suitable pigments known in the art. In one embodiment, the pigments of the present invention are titanium oxide or zinc oxide but other suitable pigments include nepheline syenite, bentonite, and calcium carbonate. Preferably, the primary pigment is titanium dioxide, such as commercially available pigments.

Metal oxide nanoparticle materials for use in a preferred embodiment of the invention have an average particle size of about 20-150 nanometers, although some embodiments can employ average sizes outside this range. In one preferred embodiment, the nanoparticle material is a zinc oxide material having an average particle size of about 60 nm.

A paint can be prepared in accordance with the principles of the present invention according to a number of known manufacturing methods. Generally, such methods involve the preparation of a binder or a multiple binder system, mixing of the additional ingredients, dispersing of the pigments, and adjusting the density and viscosity to desired levels. A variety of additives and diluents which are well known in the art can be mixed with the binders of the present invention to achieve certain properties in the paint or the coating. The additives may include, but are not limited to, surfactants, defoamers, rheology modifiers, coalescents, biocides, mildewcides, surfactants, and other additives well known in the art.

In one embodiment, a paint in accordance with the principles of the present invention is manufactured to a VOC (Volatile Organic Compounds) content of about 150 grams per liter (gr/L), including about 37% solid by volume, about 51% solid by weight, about 34 PVC, and about 1.5 pigment to binder ratio.

The PVC of paint in accordance with the principles of a preferred form of the present invention may vary between about 4 and about 55 by weight. In one embodiment of the present invention the paint is a "semi-gloss paint", which has a relatively low PVC. In another embodiment of the present invention, the paint is a "satin paint", which has a relatively high PVC. In another embodiment of the present invention, the paint is a "flat paint", which has a relatively high PVC compared to satin paint.

Table 1 lists the general ranges of the main ingredients of a paint in accordance with the principles of a preferred embodiment. The total amount of binder (i.e., polymer, latex, vehicle) is preferably between about 30 and about 60 gallons per 100 gallons. The total amount of pigment, excluding the titanium dioxide ($TiO_2$), is preferably between about 15 and about 325 pounds per 100 gallons. The $TiO_2$ content is preferably between 0 pounds per gallon and about 360 pounds per 100 gallons. The preservatives comprise between about 5 and about 8 pounds per 100 gallons. Additional additives comprise about 50 and about 200 pounds per 100 gallons. Water comprises between about 50 and about 200 pounds per 100 gallons. The paint further includes additional solvent, aside from the water content of between about 0 and about 45 pounds per 100 gallons.

TABLE 1

Ingredients Range

| Category | Pounds/100 Gallons | |
|---|---|---|
| | Minimum | Maximum |
| Additive | 50.00 | 200.00 |
| Binder | 450.00 | 635.00 |
| Extender Pigment | 15.00 | 150.0 |
| Titanium Dioxide | 0.00 | 360.00 |
| Preservative | 5.0 | 8.0 |
| Water | 50.00 | 200.00 |
| Solvent | 0.00 | 45.00 |
| Total | 600 | 1598 |
| Volume % Solids | 25 | 40 |
| Weight % Solids | 30 | 55 |
| PVC | 4 | 55 |

The preferred formulation process consists of two conventional steps: the grind and the letdown. During the grind, the solvent (water), dispersant, defoamer, zinc oxide, ethylene glycol, amino alcohol, nepheline syenite, attapulgite clay are mixed together. During the letdown, the binder, the mildewcide, the rheology modifier, and the biocide, are added to the grind product.

The following non-limiting examples illustrate main components of the paint formulations and the paint formulations themselves. Table 2 provides the material ranges for the components of the paint formulations of Examples 1-4.

TABLE 2

Raw Material Ranges

| Raw Material | Range in lbs/100 gal |
|---|---|
| Water | 70-220 |
| Copolymer Dispersant | 10-20 |
| Nanoparticle Inorganic Oxide | 4-20 |
| Zinc Oxide | 0-7 |
| Phosphated Co-Ester Surfactant | 3-6 |
| Mineral Oil Defoamer | 4-8 |
| Extender Pigment | 10-305 |
| Glycol | 0-35 |
| Rheology Modifier | 15-30 |
| 100% Acrylic Primer Binder | 340-430 |
| 100% Acrylic Topcoat Binder | 70-100 |
| Styrene Acrylic Topcoat Binder | 0-180 |
| Coalescent | 0-15 |
| In-can Biocide | 0.5-2 |
| Mildewcide | 6-8 |
| Non-ionic Rheology Modifier | 7-25 |
| Amino Alcohol | 0-1 |
| Titanium Dioxide | 0-350 |
| Bentonite | 0-6 |
| Fluoro Surfactant | 0-0.4 |
| Opaque Polymer | 0-110 |
| Attapulgite Clay | 0-8 |
| Non-ionic Surfactant | 0-5 |
| Calcined Diatomaceous | 0-45 |

Example 1

Semi-Gloss Finish

Example 1 was formulated using the basic components of Table 2, with the following specific components:

TABLE 3

| Description | Amount | Weight % |
|---|---|---|
| Grind | | |
| Water | 73.92 | 6.98 |
| Copolymer Dispersant | 15.02 | 1.42 |
| Mineral Oil Defoamer | 2.00 | 0.19 |
| Zinc Oxide | 5.00 | 0.47 |
| Nanoparticle Metal Oxide | 3.00 | 0.28 |
| Ethylene Glycol | 32.00 | 3.02 |
| Amino Alcohol | 0.50 | 0.05 |
| Non-ionic Surfactant | 4.00 | 0.38 |
| Nepheline Syenite | 10.00 | 0.94 |
| Attapulgite Clay | 5.00 | 0.47 |
| Letdown | | |
| 100% Acrylic Primer Binder | 410.65 | 38.77 |
| 100% Acrylic Topcoat Binder | 86.44 | 8.16 |
| Mineral Oil Defoamer | 3.00 | 0.28 |
| TiO$_2$ Slurry | 297.00 | 28.04 |
| Coalescent | 8.00 | 0.76 |
| Associative Rheology Modifier | 28.00 | 2.64 |
| Non-ionic HEUR Rheology Modifier | 8.00 | 0.76 |
| Opaque Polymer | 58.80 | 5.55 |
| Phosphated Co-ester Surfactant | 1.00 | 0.09 |
| Mildewcide | 6.94 | 0.65 |
| In-can Biocide | 1.00 | 0.09 |

Example 2

Satin Finish

Example 2 was formulated using the basic components of Table 2, with the following specific components:

TABLE 4

| Grind | Amount | Weight % |
|---|---|---|
| Water | 45.35 | 4.06 |
| Copolymer Dispersant | 15.02 | 1.35 |
| Mineral Oil Defoamer | 3.00 | 0.27 |
| Nanoparticle Metal Oxide | 15.00 | 1.34 |
| Ethylene Glycol | 37.00 | 3.32 |
| Amino Alcohol | 0.50 | 0.04 |
| Non-ionic Surfactant | 2.00 | 0.18 |
| Nepheline Syenite | 105.02 | 9.41 |
| Attapulgite Clay | 5.01 | 0.45 |
| Letdown | | |
| 100% Acrylic Primer Binder | 410.60 | 36.82 |
| 100% Acrylic Topcoat Binder | 86.43 | 7.75 |
| TiO$_2$ Slurry | 294.32 | 26.39 |
| Coalescent | 8.00 | 0.72 |
| Phosphated Co-ester Surfactant | 1.00 | 0.09 |
| Associative Rheology Modifier | 25.00 | 2.24 |
| Non-ionic HEUR Rheology Modifier | 4.00 | 0.36 |
| Opaque Polymer | 50.05 | 4.49 |
| Mildewcide | 6.94 | 0.62 |
| In-can Biocide | 1.00 | 0.09 |

Example 3

Flat Finish

Example 3 was formulated using the basic components of Table 2, with the following specific components:

TABLE 5

| Grind | Amount | Weight % |
|---|---|---|
| Water | 25.27 | 2.18 |
| Ethylene Glycol | 22.55 | 1.95 |
| Non-ionic Surfactant | 2.00 | 0.17 |
| Copolymer Dispersant | 15.30 | 1.32 |
| Zinc Oxide | 4.92 | 0.42 |
| Nanoparticle Metal Oxide | 4.92 | 0.43 |
| Amino Alcohol | 0.98 | 0.09 |
| Mineral Oil Defoamer | 1.97 | 0.17 |
| Nepheline Syenite | 94.70 | 8.18 |
| Attapulgite Clay | 7.92 | 0.68 |
| Phosphated Co-ester Surfactant | 3.87 | 0.33 |
| Letdown | | |
| TiO$_2$ Slurry | 350.02 | 30.26 |
| Water | 82.22 | 7.1 |
| Calcined Diatomaceous Earth | 44.28 | 3.82 |
| 100% Acrylic Primer Binder | 285.04 | 24.64 |
| 100% Acrylic Topcoat Binder | 60.02 | 5.19 |
| Opaque Polymer | 105.79 | 9.15 |
| Coalescent | 7.87 | 0.68 |
| Associative Rheology Modifier | 18.81 | 1.63 |
| Mildewcide | 6.82 | 0.59 |
| Mineral Oil Defoamer | 3.94 | 0.34 |
| Non-ionic HEUR Rheology Modifier | 6.43 | 0.56 |
| In-can Biocide | 0.96 | 0.08 |

Example 4

Flat Finish

Example 4 was formulated using the basic components of Table 2, with the following specific components:

TABLE 6

| Grind | Amount | Weight % |
|---|---|---|
| Water | 197.00 | 21.15 |
| Ethylene Glycol | 30.00 | 3.22 |
| Non-ionic Surfactant | 1.00 | 0.85 |
| Copolymer Dispersant | 8.00 | 0.86 |
| Nanoparticle Metal Oxide | 8.00 | 0.86 |
| Mineral Oil Defoamer | 6.00 | 0.64 |
| Nepheline Syenite | 90.0 | 9.64 |
| Bentonite | 6.00 | 0.64 |
| Letdown | | |
| Opaque | 4.00 | .43 |
| 100% Acrylic Primer Binder | 366.00 | 39.3 |
| 100% Acrylic First Topcoat Binder | 77.00 | 8.27 |
| Second Acrylic Topcoat Binder | 82.00 | 8.8 |
| Coalescent | 5.00 | 0.54 |
| Associative Rheology Modifier | 18.00 | 1.9 |
| Mildewcide | 6.92 | 0.74 |
| Non-ionic HEUR Rheology Modifier | 25.00 | 2.68 |
| In-can Biocide | 1.00 | 0.1 |

Adhesion Tests

Various adhesion tests were performed to determine the adhesion properties of a paint in accordance with the principles of the present invention on different substances. The results of the tests compare a paint of the present invention to a typical, commercially-available paint and typical, commercially available primer, and these tests are presented in Table 7.

In addition, a battery of tests were performed to evaluate the overall performance of a paint in accordance with the principles of the present invention at various sheens as compared to paints currently available in the marketplace. As shown in the results in Tables 8 and 9, the paint prepared in accordance with the principles of the present invention outperformed all of the other paints in the respective category.

TABLE 8

Flat Sheen Benchmarking Composite Scores

| Test | Flat Paint Formulation of the Present Invention | Commercial Acrylic Flat** | Possible Score |
|---|---|---|---|
| Freeze-Thaw | 1 | 0 | 2 |
| Heat Stability | 1.5 | 3 | 3 |
| Applied Holding | 7.5 | 5 | 10 |
| Leveling | 5 | 0 | 5 |
| Touch-up | 7.5 | 10 | 10 |
| Drying Time | 2 | 2 | 2 |
| Sag Resistance | 3 | 3 | 3 |
| Roller Foam | 3 | 3 | 3 |
| Roller Spatter | 1 | 0.5 | 1 |
| 3 mil Contrast Ratio | 20 | 6 | 20 |
| Dry Adhesion | 12 | 7.5 | 15 |
| Blistering Resistance | 9 | 9 | 9 |
| Wet Adhesion | 15 | 15 | 15 |
| Water Spotting | 2 | 2 | 2 |
| Total Score | 89.5 | 66 | 100 |

**The Commercial Acrylic Flat paint tested was at least comparable to those readily available on the commercial market.

TABLE 7

Adhesion Test Results Rated by ASTM D3359

| Adhesion Test | Test Condition | Satin Paint Formulation of the present invention | Acrylic Exterior Primer* (Control) | Acrylic Exterior Satin Topcoat* (Control) |
|---|---|---|---|---|
| Alkyd | | | | |
| green | overnight, dry/wet | 5B/4B | 5B/4B | 5B/5B |
| gray | overnight, dry/wet | 5B/5B | 5B/5B | 5B/5B |
| Chalk | | | | |
| blue latex panel | overnight, dry/wet | 5B/5B | 5B/4B | 5B/5B |
| Wood | | | | |
| Cedar | overnight, dry/wet | 4B/5B | 3B/3B | 4B/5B |
| Oak | overnight, dry/wet | 5B/5B | 5B/4B | 5B/5B |
| Redwood | overnight, dry/wet | 5B/5B | 5B/4B | 5B/5B |
| PT green | overnight, dry/wet | 5B/5B | 5B/5B | 5B/5B |
| Vinyl Siding | | | | |
| new vinyl | overnight, dry/wet | 5B/5B | 5B/5B | B/5B |
| weathered vinyl | overnight, dry/wet | 5B/5B | 5B/5B | 5B/5B |
| Metals | | | | |
| galvanized steel | overnight, dry/wet | 4B/5B | 3B/3B | 0B/0B |
|  | 3 day, dry/wet | 5B/3B | 4B/4B | 0B/0B |
| aluminum roll | overnight, dry/wet | 2B/3B | 3B/3B | 0B/0B |
|  | 3 day, dry/wet | 4B/5B | 4B/4B | 0B/0B |
| Miscellaneous | | | | |
| glossy black tile | overnight, dry/wet | 5B/3B | 2B/0B | 0B/0B |
|  | 3 day, dry/wet | 5B/5B | 5B/2B | 0B/0B |
| clay tile | overnight, dry/wet | 5B/3B | 1B/0B | 1B/0B |
|  | 3 day, dry/wet | 5B/5B | 5B/5B | 3B/0B |
| bull nose brick | overnight, dry/wet | 5B/0B | 4B/0B | 4B/0B |
|  | 3 day, dry/wet | 5B/0B | 5B/0B | 2B/0B |

*The control Acrylic Exterior Primer and Control Acrylic Exterior Topcoat tested were at least comparable to those readily available on the commercial market.

As seen in Table 9, the satin sheen of the present invention exhibits improved leveling, roller foam, contrast, and dry adhesion.

TABLE 9

Satin Sheen Benchmarking Composite Scores

| Test | Satin Paint Formulation of the Present Invention | Commercial Acrylic Exterior Satin*** | Commercial Silicone Acrylic Exterior Satin*** | Possible Score |
| --- | --- | --- | --- | --- |
| Freeze-Thaw | 2 | 1 | 2 | 2 |
| Heat Stability | 3 | 3 | 3 | 3 |
| Applied Holding | 10 | 5 | 10 | 10 |
| Leveling | 5 | 2.5 | 0 | 5 |
| Touch-up | 7.5 | 4 | 7.5 | 10 |
| Drying Time | 2 | 2 | 2 | 2 |
| Sag Resistance | 3 | 3 | 3 | 3 |
| Roller Foam | 3 | 3 | 1.5 | 3 |
| Roller Spatter | 1 | 1 | 1 | 1 |
| 3 mil Contrast Ratio | 20 | 20 | 14 | 20 |
| Dry Adhesion | 12 | 0 | 12 | 15 |
| Blistering Resistance | 15 | 7 | 15 | 9 |
| Wet Adhesion | 9 | 15 | 9 | 15 |
| Water Spotting | 2 | 2 | 2 | 2 |
| Total Score | 94.5 | 68.5 | 82 | 100 |

***The Commercial Acrylic Satin Exterior and Commercial Silicone Acrylic Exterior Satin tested were at least comparable to those readily available on the commercial market.

Figure 2:
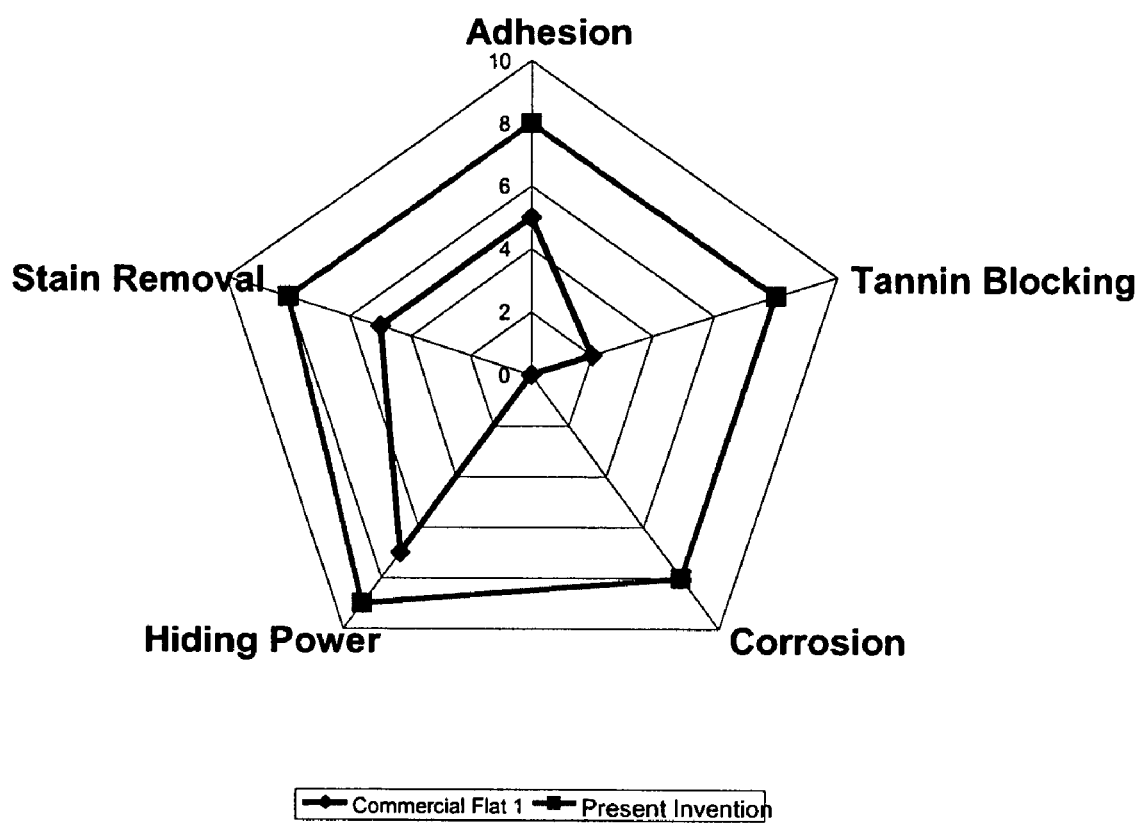
FIG. 2 depicts a multi-axis property graph of the test results of flat white base paint in accordance with the principles of the present invention, as compared to a commercially available exterior flat paint in a white base.
Figure 3:
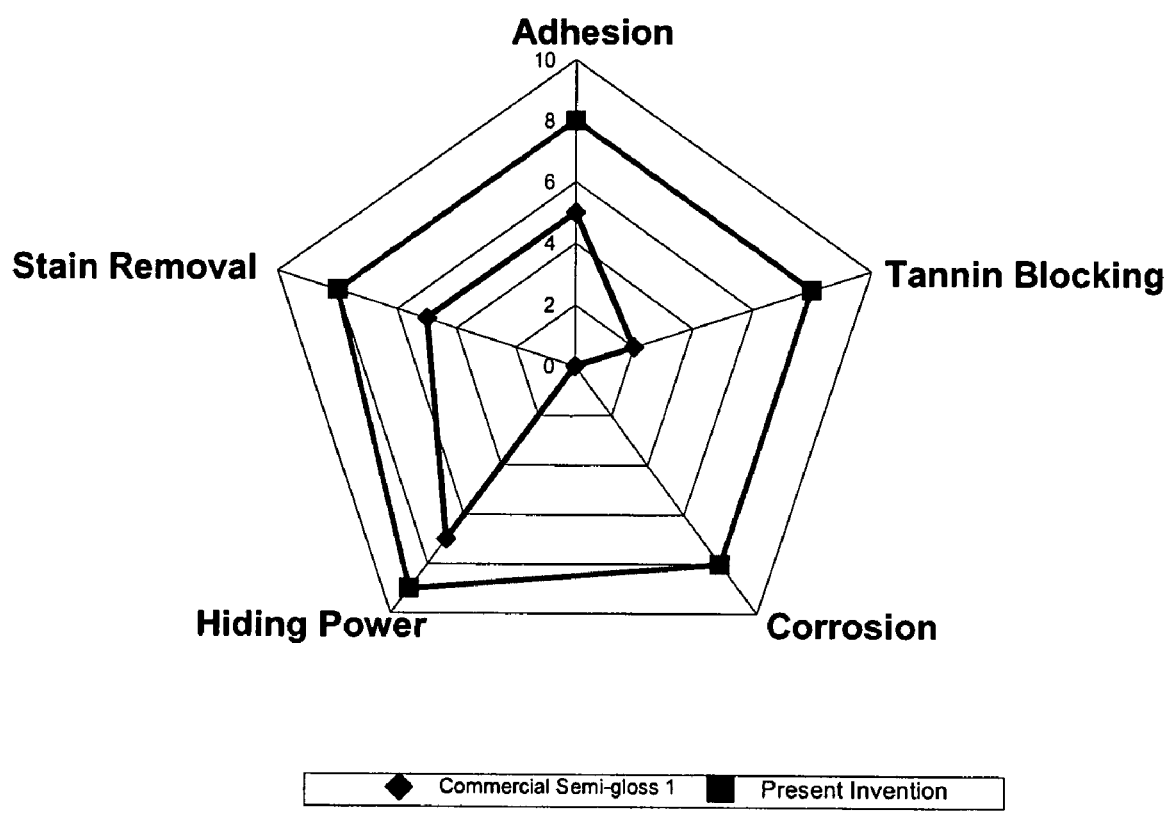
FIG. 3 illustrates a multi-axis property graph of the test results for semi-gloss white base paint of the present invention versus a commercially-available, exterior semi-gloss paint in a white base.
Figure 4:
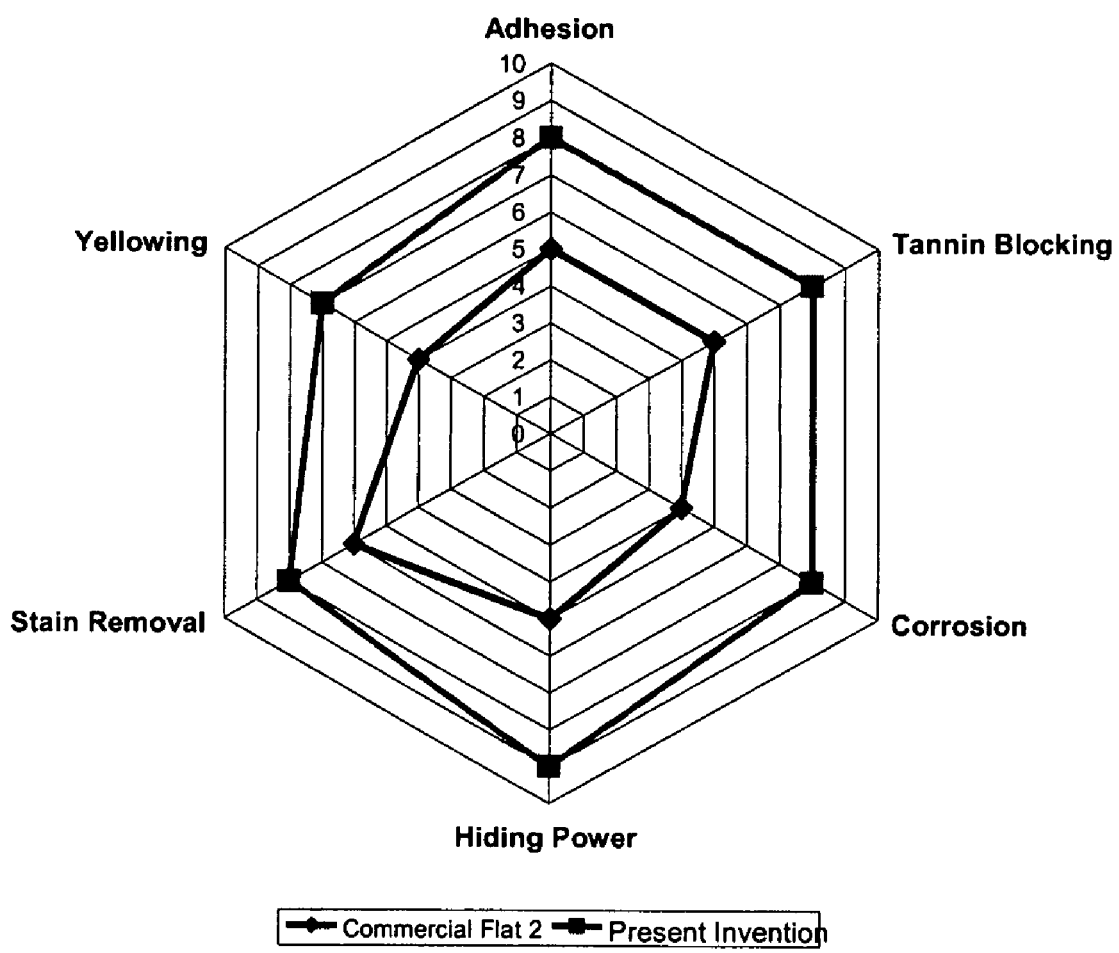
FIG. 4 illustrates a multi-axis property graph for a flat white base paint of the present invention versus a second commercially available exterior flat paint in a white base.
Figure 5:
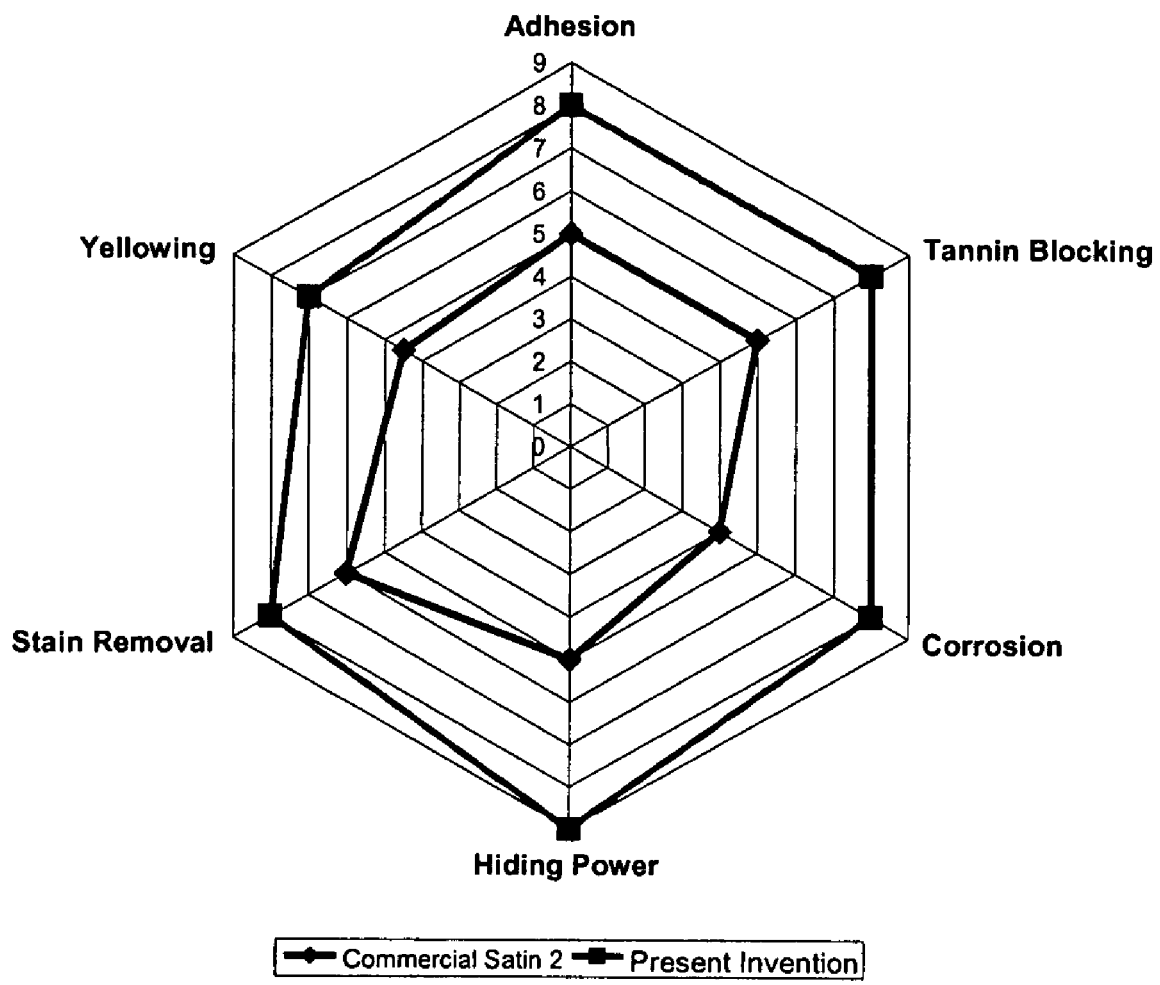
FIG. 5 illustrates a multi-axis property graph for a satin white base paint of the present invention versus a second commercially-available, exterior satin paint in a white base.

As illustrated in FIGS. 1, 2, 3, 4, and 5, paint prepared in accordance with the principles of the present invention exhibits improvements in adhesion, tannin blocking, stain removal, hiding power, and corrosion resistance. FIG. 1 depicts a multi-axis property graph of the test results of paint of the present invention having a satin sheen and white base, as compared to commercially-available, exterior satin in a white base. Adhesion, yellowing, stain removal, hiding power, scrub resistance, corrosion, and tannin blocking were measured. FIG. 2 depicts a multi-axis property graph of the test results of flat white base paint in accordance with the principles of the present invention, as compared to a commercially available exterior flat paint in a white base. FIG. 3 illustrates a multi-axis property graph of the test results for semi-gloss white base paint of the present invention versus a commercially available exterior semi-gloss paint in a white base. All properties were improved in formulations in accordance with the principles of the present invention with the exception of scrub resistance and yellowing, which showed a reduction. FIG. 4 illustrates a multi-axis property graph for a flat white base paint of the present invention versus a second commercially-available, exterior flat paint in a white base. All properties were improved in formulations in accordance with the principles of the present invention. FIG. 5 illustrates a multi-axis property graph for a satin white base paint of the present invention verses a second commercially-available, exterior satin paint in a white base. All properties were improved in formulations in accordance with the principles of the present invention.

Deep Base Formulations

One aspect of the present invention relates to paints which have deep base formulations. Deep base formulations are generally understood by the art as base paint formulations which are intended to have a high level of pigment added to them to achieve the desired color, typically a very vivid or dark color. The present invention shall refer to any of the multitude of formulations designed to accept larger volumes of pigment as "deep base", though such formulations are sometimes refers to not only as deep base, but as accent base, ultra-deep base, and neutral base. These formulations are designed to be able to accept a larger volume (and weight percent) of pigment. In one embodiment, paint formulations which include less than 60 pounds/100 gallons of pigmentary-sized pigment (e.g. $TiO_2$) are considered to be deep base formulations.

In one embodiment, in a deep base formulation, the three binder system previously described exhibits less than ideal characteristics when dried. Thus, in one exemplary embodiment of the present invention, a third binder is added to the paint formulation to form a composition which exhibits the properties of "lighter" base paints as discussed previously and shown in FIGS. 1-5. This third binder comprises a second topcoat binder. Thus, a deep base formulation in accordance with the principles of the present invention comprises a first primer binder, a first topcoat binder, and a second topcoat binder. In one embodiment, the binders are acrylic binders; and in one exemplary embodiment, the binders are each self-crosslinking. In one embodiment, the amount of the second topcoat binder is varied in relation to the amount of $TiO_2$ to be added (i.e., less $TiO_2$ is utilized when more colorant is used). Table 10 provides a general formulation for a deep base paint in accordance with the principles of the present invention. Such deep base formulations can be designed, as known in the art, to have any of the paint coating finishes discussed above, such as semi gloss or satin. In addition, one of ordinary skill in the art will appreciate that the ratio of primer to topcoat binder maybe be varied to achieve the desired balance of coverage (primer) and finished look (topcoat).

TABLE 10

General Deep Base Formulation

| Grind | Approximate Solid Weight % |
|---|---|
| Water | 4-20 |
| Ethylene Glycol | 2.0-2.5 |
| Copolymer Dispersant | 0.5-1.0 |
| Nanoparticle Metal Oxide | 0.5-1.0 |
| Mineral Oil Defoamer | 0-0.5 |
| Nepheline Syenite | 1.5-2.5 |
| Clay | 0.2-0.3 |
| Nonionic surfactant | 0.3-0.5 |
| Letdown | |
| Cellulosic thickener | 0-0.2 |
| Water | 0-5 |
| First Primer Binder | 10-22 |
| First Topcoat Binder | 2-6 |
| Second Topcoat Binder | 35-55 |
| Coalescent | 2-3 |
| Rheology Modifier | 0.5-1.0 |
| Mildewcide | 0-1.0 |
| Non-ionic HEUR Rheology Modifier | 3-5 |
| In-can Biocide | 0-0.2 |

Deep Base Examples

Figure 6:
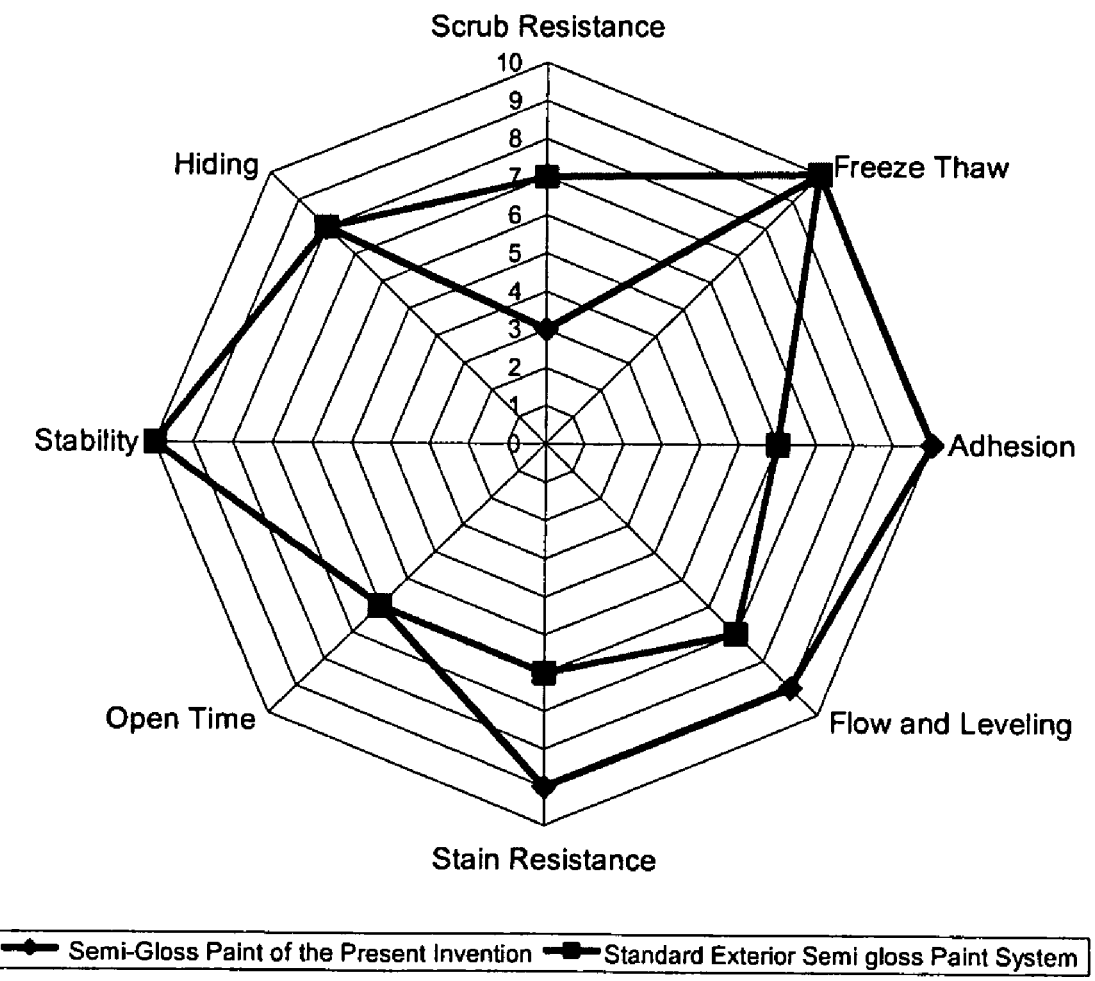
FIG. 6 illustrates a multi-axis property graph for a semi-gloss deep base paint of the present invention versus a commercially-available exterior paint.
Figure 7:
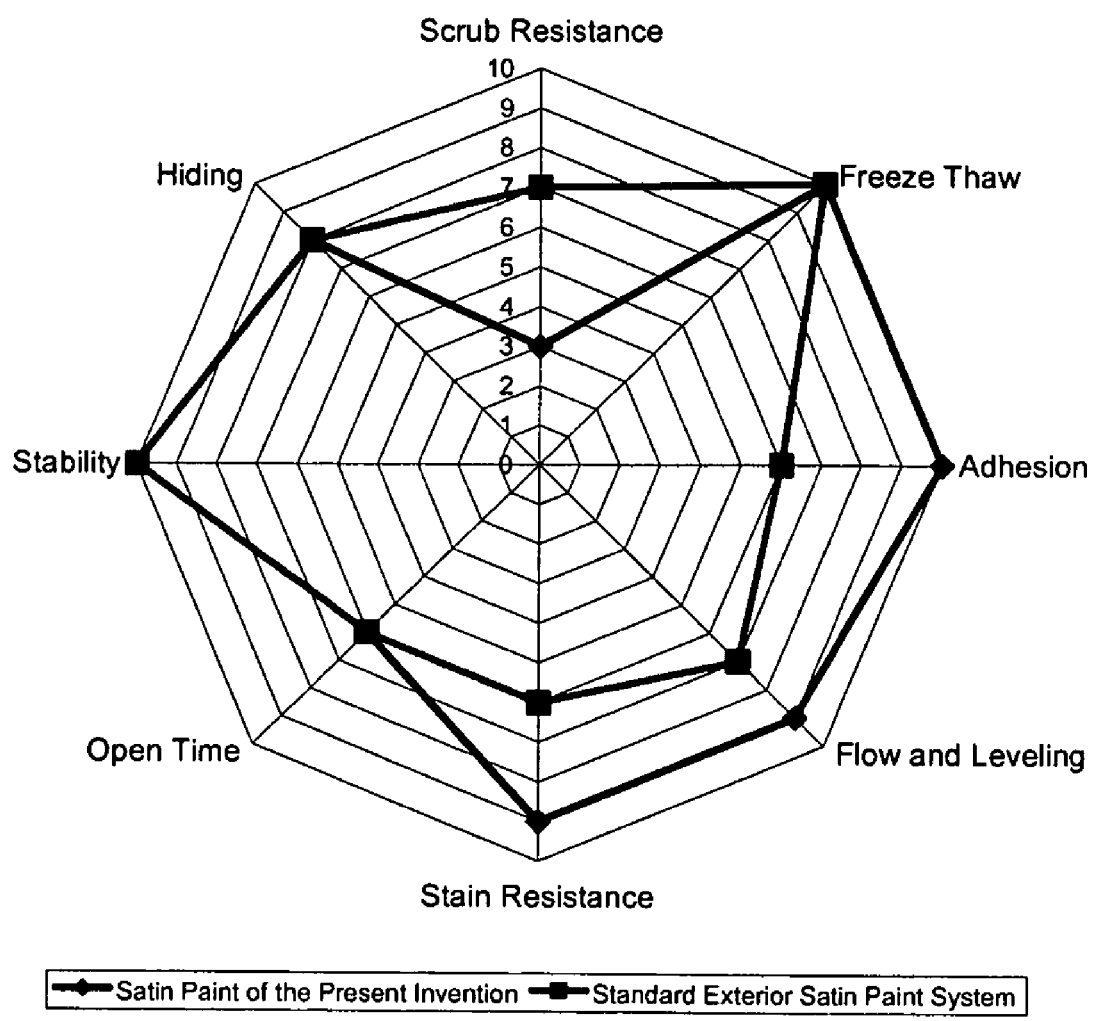
FIG. 7 illustrates a multi-axis property graph for a satin deep base paint of the present invention versus a commercially-available exterior paint.

FIGS. 6 and 7 depict a multi-axis property graphs of the test results, similar to those in FIGS. 1-5 for the two-binder formulation described above, of a deep base paint of Table 11, as compared to commercially-available, exterior paint. FIG. 6 provides a comparison of a semigloss deep base paint having a 70/30 ratio as set forth in Table 11. FIG. 7 provides a similar comparison as FIG. 6, but for a 70/30 ratio deep base having a satin finish as listed in Table 12.

As discussed above, the present invention encompasses various ratios of the three binders depending on the desired "finish" of the coating. Table 11 illustrates the same information for a semigloss finish. Table 12 illustrates exemplary weight percentages and ratios for three common binder ratios for a satin finish.

TABLE 11

Weight Ratios for semigloss "Deep Base" formulations
Semigloss Deep

| | Wet lbs | Dry lbs | % by dry weight solid | Ratio |
|---|---|---|---|---|
| 60:40 Ratio | | | | |
| First primer binder | 193 | 83 | 31 | 40 |
| First topcoat binder | 49 | 25 | 9 | |
| Second topcoat binder | 356 | 160 | 60 | 60 |
| 70:30 Ratio | | | | |
| First primer binder | 145 | 62 | 23 | 30 |
| First topcoat binder | 37 | 19 | 7 | |
| Second topcoat binder | 416 | 187 | 70 | 70 |
| 80:20 Ratio | | | | |
| First primer binder | 97 | 41 | 15.5 | 20 |
| First topcoat binder | 25 | 13 | 4.5 | |
| Second topcoat binder | 476 | 214 | 80 | 80 |

TABLE 12

Weight Ratios for satin "Deep Base" formulations
Satin Deep

| | Wet lbs | Dry lbs | % by dry weight solid | Ratio |
|---|---|---|---|---|
| 60:40 Ratio | | | | |
| First primer binder | 192 | 83 | 31 | 40 |
| First topcoat binder | 48 | 25 | 9 | |
| Second topcoat binder | 355 | 160 | 60 | 60 |
| 70:30 Ratio | | | | |
| First primer binder | 144 | 62 | 23 | 30 |
| First topcoat binder | 36 | 19 | 7 | |
| Second topcoat binder | 415 | 187 | 70 | 70 |
| 80:20 Ratio | | | | |
| First primer binder | 96 | 41 | 15.5 | 20 |
| First topcoat binder | 24 | 12 | 4.5 | |
| Second topcoat binder | 475 | 214 | 80 | 80 |

While several embodiments have been shown and described in this application, it is understood that changes and modifications can be made to the invention without departing from the invention's broader aspects. The examples and specific formulations are for illustrative purposes and should not be construed as limiting the scope of the invention. Unless otherwise specified, weight percentages are solid weight percentages.

What is claimed is:

1. A process for producing a paint composition comprising the steps of:
   dispersing a pigment in a solvent to form a dispersion;
   mixing the dispersion with grind additives comprising a nanoparticle metal oxide;
   adding a first 100% acrylic primer binder, a first acrylic topcoat binder, and a second acrylic topcoat binder to the dispersion in a respective ratio selected from the group consisting of 23:7:70, and 15.5:4.5:80; and
   adding letdown additives to the dispersion.

2. The process of claim 1, wherein the nanoparticle metal oxide comprises zinc oxide.

3. The process of claim 1, wherein the nanoparticle metal oxide comprises particles having an average particle size of less than 100 nanometers.

4. The process of claim 1, wherein the nanoparticle metal oxide comprises particles having an average particle size of between about 30 nanometers and about 65 nanometers.

5. The process of claim 1, wherein the step of adding the first acrylic topcoat binder includes adding a 100% acrylic topcoat binder.

6. The process of claim 1, wherein the first 100% acrylic primer binder comprises a self-crosslinking polymer.

7. The process of claim 1, wherein the second acrylic topcoat binder comprises a 100% acrylic binder.

8. A process for producing a paint composition comprising the steps of:
   dispersing a nanoparticle metal oxide in a solvent with a dispersant to form a dispersion;
   mixing the dispersion with grind additives including pigmentary titanium dioxide;
   adding a first acrylic primer binder, a second acrylic topcoat binder, and a third acrylic topcoat binder to the dispersion in a respective ratio selected from the group consisting of 23:7:70, and 15.5:4.5:80; and
   adding letdown additives to the dispersion.

\* \* \* \* \*